United States Patent [19]
Chenglin

[11] Patent Number: 5,615,604
[45] Date of Patent: Apr. 1, 1997

[54] PERSONAL COOKING APPLIANCE

[76] Inventor: Yueh-Kung Chenglin, P.O. Box 82-144, Taipei, Taiwan

[21] Appl. No.: 613,525

[22] Filed: Mar. 11, 1996

[51] Int. Cl.$^6$ .............................. A47J 37/00; A47J 37/06; H05B 1/00; H05B 3/06

[52] U.S. Cl. .................. 99/332; 99/331; 99/375; 99/376; 99/378; 99/424; 219/386; 219/474; 219/533; 219/524

[58] Field of Search .............................. 99/326, 331–333, 99/339, 340, 372–384, 385, 389, 422–425, 426, 444–446; 219/386, 472, 474, 477, 521–533, 536, 506, 535

[56] References Cited

U.S. PATENT DOCUMENTS

| | | | |
|---|---|---|---|
| 1,866,874 | 7/1932 | Barnes et al. | 99/379 |
| 2,478,529 | 8/1948 | Farr et al. | 219/524 |
| 2,765,727 | 10/1956 | Lipsich et al. | 219/525 X |
| 2,881,299 | 4/1959 | Jepson | 99/340 |
| 2,985,094 | 5/1961 | Shaw et al. | 99/331 |
| 3,108,531 | 10/1963 | Jepson et al. | 99/331 |
| 3,172,999 | 3/1965 | Sutton et al. | 99/376 X |
| 3,963,898 | 6/1976 | Tuckwell | 219/386 X |
| 4,011,431 | 3/1977 | Levin | 99/446 X |
| 4,088,067 | 5/1978 | Kaebitzsch et al. | 99/379 |
| 4,091,720 | 5/1978 | Wheeler | 99/375 |
| 4,178,500 | 12/1979 | Brindopke | 219/524 |
| 4,987,827 | 1/1991 | Marquez | 99/331 |

Primary Examiner—Timothy F. Simone
Attorney, Agent, or Firm—Alfred Lei

[57] ABSTRACT

A personal cooking appliance including a container having a first recess, a first edge surrounding the recess, a timer mounted on a front side of the container, a switch installed on a front side of the container, a pair of lugs each having an elliptical opening, and two grips mounted on respective lateral sides of the container, a first heater arranged within the container and electrically connected with said timer and the switch, a rectangular lid having a second recess, the second recess being less than the first recess in depth, a second edge surrounding the first recess, a third edge surrounding a front and two lateral sides thereof, a pair of ears each having a pin adapted to fit into the elliptical opening, a protective plate provided on a front side of the lid, and a handle fixedly mounted on the protective plate, and a second heater arranged within the container and electrically connected with the timer and the switch, whereby the personal cooking appliance is particularly fit for a bachelor living independently.

1 Claim, 2 Drawing Sheets

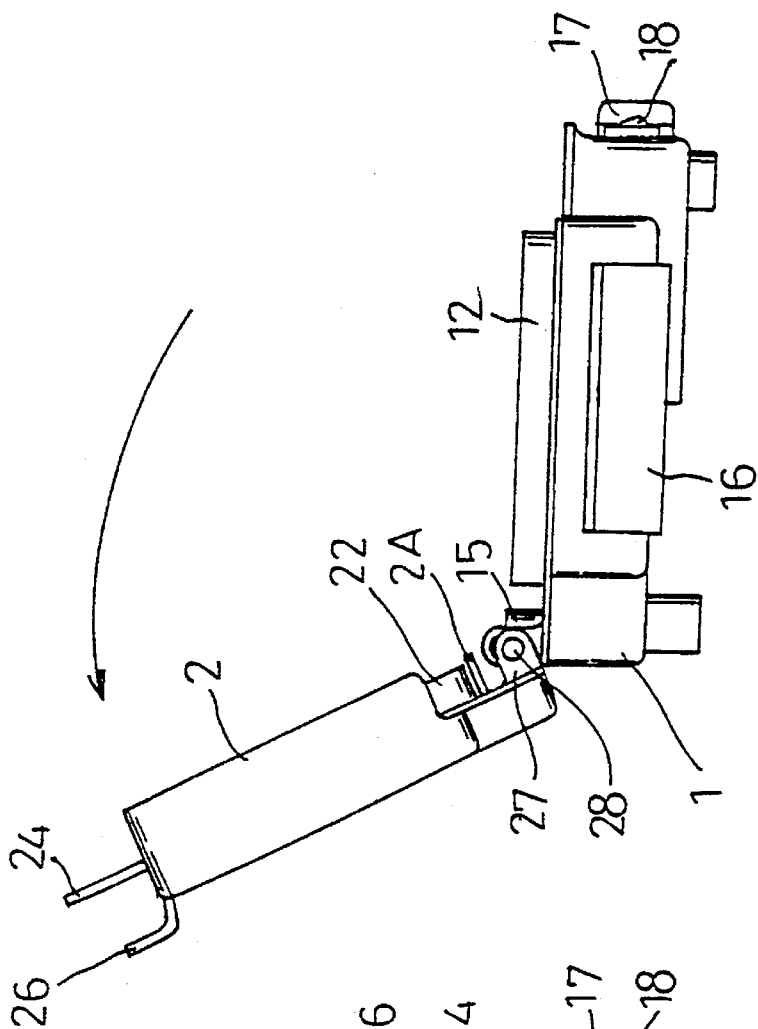
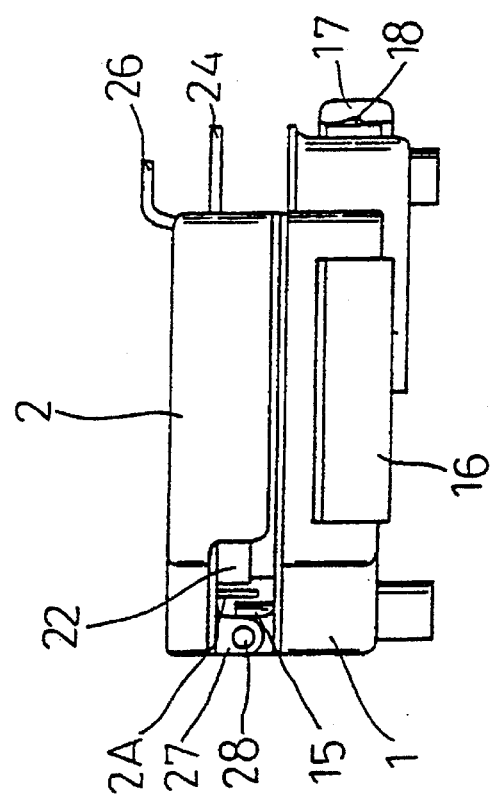
FIG. 3
FIG. 2

PERSONAL COOKING APPLIANCE

BACKGROUND OF THE INVENTION

1. Field of the Invention

This invention relates to a personal cooking appliance and in particular to one which is fit for a bachelor living independently.

2. Description of the Prior Art

It has been found that smoke will be produced during cooking, especially when frying, thereby making the walls of the kitchen dirty. Furthermore, the smoke may hurt one's health and is reported to cause lung cancer to those who have stayed in this condition for a long period of time. Hence, a so-called range hood has been developed to exhaust the smoke produced in cooking, frying, or the like out of the kitchen in order to keep the kitchen clean and protect the user from being injured by the smoke. However, for those such as students who lives in dormitory, it will be hardly possible for them to have a range hood. In addition, the smoke exhausted out of the kitchen is still harmful to the environment.

Therefore, it is an object of the present invention to provide a personal cooking device which produces a little smoke when in use and is compact in size thus making it suitable for use even in a sitting room, a bed room, a study room . . . etc.

SUMMARY OF THE INVENTION

This invention relates to a personal cooking appliance.

It is the primary object of the present invention to provide a personal cooking appliance which is compact in size.

It is another object of the present invention to provide a personal cooking appliance which is convenient to use.

It is still another object of the present invention to provide a personal cooking appliance which is safe in use.

It is still another object of the present invention to provide a personal cooking appliance which can be used for cooking various kinds of foods with different thickness (such as chicken legs, thick steaks, or the like).

It is a further object of the present invention to provide a personal cooking appliance which can be rapidly heated for cooking.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 2 is a side view of the present invention shown in closed position; and

FIG. 3 is a side view of the present invention shown in open position.

DETAILED DESCRIPTION OF THE PREFERRED EMBODIMENT

Figure 1:
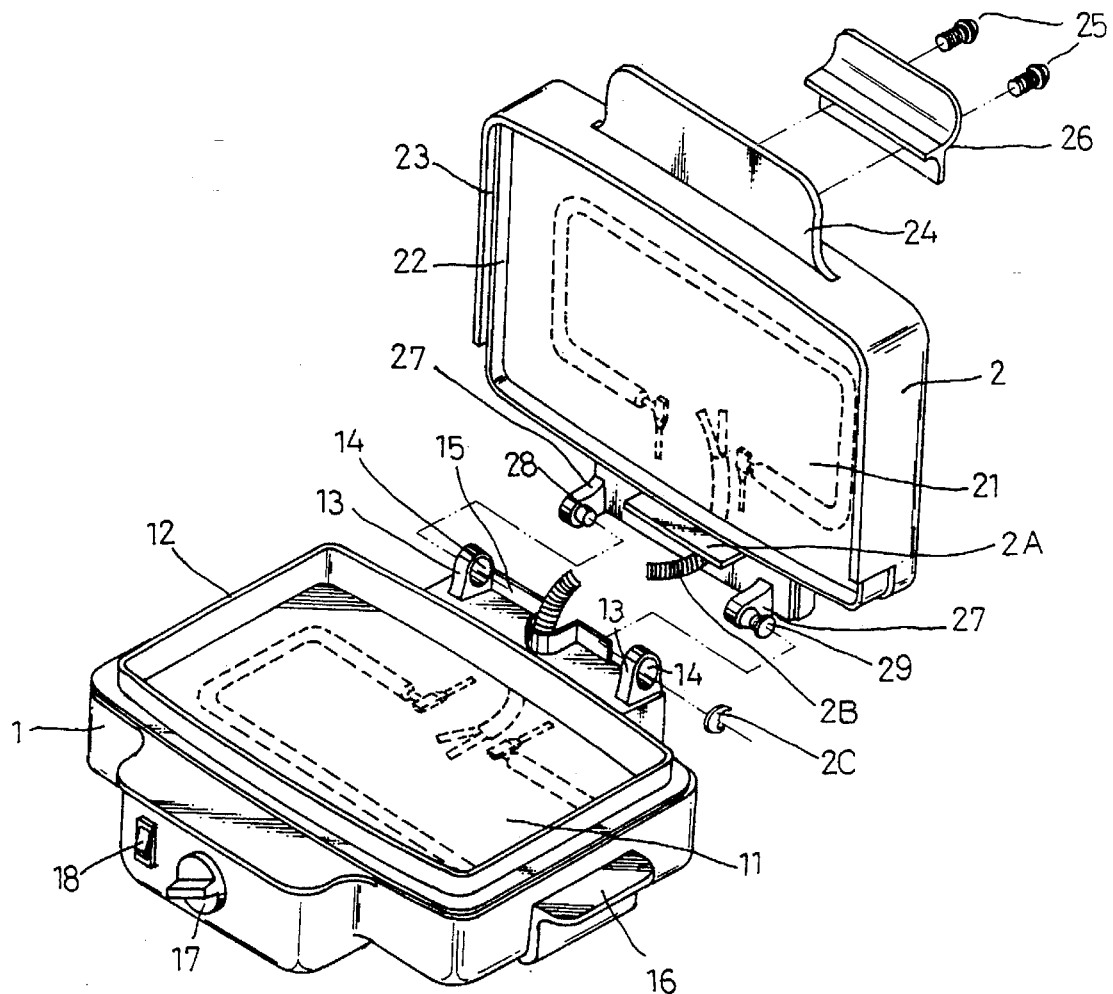
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

With reference to the drawings and in particular to FIG. 1 thereof, the personal cooking appliance according to the present invention comprises a container 1 and a lid 2. The container 1 is a rectangular member formed on the top with a recess 11 and an edge 12 surrounding the recess 11. The rear long side of the container 1 has a projected rectangular portion on which there are two lugs 13 each formed with an elliptical opening 14. The projected rectangular portion has a vertical flange 15 at its outer long side. Both short sides of the container 1 are provided with a grip 16 so the container 1 can be easily held in the hand. The front long side of the container 1 has a protruded portion on which are fitted a timer 17 and a switch 18. A heater (not shown) is arranged within the container 1 and electrically connected with the timer 17 and the switch 18 which may be of any conventional design well known to those skilled in the art and are not considered a part of the invention. The timer 17 is designed for automatically starting and stopping the heater at a given time, while the switch 18 for making and breaking the electric circuit.

The lid 2 is also a rectangular member adapted to engage with the container 1. As the container 1, a heater (not shown) is arranged within the container 1 and electrically connected with the timer 17 and the switch 18. The lid 2 is formed on the top with a recess 21 surrounded by an edge 22. The depth of the recess 21 of the lid 2 is less than that of the recess 11 of the container 1. The lid 2 has an outer edge 23 enclosing the front and two lateral sides of the edge 22. The long side of the lid 2 is provided with a protective shield 24 on which is fixedly mounted a handle 26 by screws 25. The protective shield 24 is used for keeping the fingers of an user from directly contacting the steam getting out of the personal cooking appliance. The lower long side of the lid 2 has a protruded portion provided with two ears 27, one having a pin 28 and the other having a pin 29. The lid 2 is mounted on the container 1, with its pins 28 and 29 rotatably fitted into respective openings 14 of the container 1 so that the lid 2 can be rotated open or closed as desired. Since the openings 14 are elliptical in shape, the lid 2 will be able to lift a little bit for receiving food with more thickness. A C-shaped retainer ring 2C is engaged with the pin 29 so as to prevent the lid 2 from detaching from the container 2. Between the two ears 27 there is a raised plate 2A. A heat insulating tube 2B is connected between the container 11 and the lid 2 so that the electrical wires (not shown) connecting the heater of the lid 2 and the heater of the container 1 are enclosed within the heat resistant tube 2B thus preventing the electrical wires from being damaged.

When in use, it is only necessary to put the food within the container 1 and close the lid 2 on it. Then, the switch 18 is turned on to activate the heaters of the container 1 and the lid 2 (the heaters of the container 1 and the lid 2 can be turned on simultaneously or separately) and the timer 17 is set to automatically stop the operation of the heater at a given time. Furthermore, if the thickness of the food is larger than the height of the space formed between the recess 11 of the container 1 and the recess 21 of the lid 2, simply adjust the engagement between the pins 28 and 29 and the elliptical openings 14 so as to enlarge the space.

In conclusion, the present invention provides the following drawbacks:

1. Compact in size and convenient to use.
2. The container and the lid can be separately used for cooking different kinds of dishes.
3. The protective shield can keep the fingers of an user from directly contacting the steam getting out of the personal cooking appliance.
4. Capable of cooking foods with different thickness.
5. The container and the lid can be rapidly heated for cooking with low-power heaters.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:
1. A personal cooking appliance comprising:

a container having a first recess, a first edge surrounding said recess, a timer mounted on a front side of said container, a switch installed on a front side of said container, a pair of lugs each having an elliptical opening, and two grips mounted on respective lateral sides of said container;

a first heater arranged within said container and electrically connected with said timer and said switch;

a rectangular lid having a second recess, said second recess being less than said first recess in depth, a second edge surrounding said first recess, a third edge surrounding a front and two lateral sides thereof, a pair of ears each having a pin adapted to fit into said elliptical opening, a protective plate provided on a front side of said lid, and a handle fixedly mounted on said protective plate; and a second heater arranged within said container and electrically connected with said timer and said switch.

\* \* \* \* \*